United States Patent [19]

Koshida et al.

[11] Patent Number: 4,870,335
[45] Date of Patent: Sep. 26, 1989

[54] ROTARY ACTUATOR

[75] Inventors: Yoshinori Koshida; Akihisa Tashiro, both of Tokyo, Japan

[73] Assignee: Oki Electric Industry Co., Ltd., Tokyo, Japan

[21] Appl. No.: 147,554

[22] Filed: Jan. 19, 1988

[30] Foreign Application Priority Data

Jan. 19, 1987 [JP] Japan .................................. 62-8164

[51] Int. Cl.$^4$ ..................... G05B 19/04; H02K 33/18
[52] U.S. Cl. .................................... 318/567; 310/27; 335/229
[58] Field of Search ................. 318/288, 567; 310/13, 310/27; 73/862.68; 324/132, 141, 142, 146, 150, 151 A, 151 R, 158 R; 335/220, 229

[56] References Cited

U.S. PATENT DOCUMENTS

| | | | |
|---|---|---|---|
| 1,985,082 | 12/1934 | Faus | 324/151 R |
| 2,495,858 | 1/1950 | Marti | 310/27 |
| 2,547,665 | 4/1951 | Rowell | 324/151 A X |
| 2,833,989 | 5/1958 | Nylander | 324/150 |
| 2,836,796 | 5/1958 | Millar et al. | 324/151 A |
| 2,846,649 | 8/1958 | Hornauer | 324/151 A X |
| 2,958,041 | 10/1960 | Schake | 324/151 R X |
| 3,036,243 | 5/1962 | Glassburn | 324/150 X |
| 3,056,341 | 10/1962 | Grey | 335/229 |
| 4,223,266 | 9/1980 | Scannell | 324/151 A X |

Primary Examiner—Bentsu Ro
Attorney, Agent, or Firm—Spencer & Frank

[57] ABSTRACT

A rotary actuator includes a case, a shaft rotatably supported in the case, a moving coil with conductors extending radially from the shaft as a center, a support which supports the moving coil on the shaft, facing magnets set with facing unlike poles arranged alternately in the direction of motion of the moving coil on either side of it and generating a magnetic flux which crosses the moving coil conductors, a device for restricting rotation of the shaft such that the conductors of the moving coil do not move outside the magnetic flux generated by the magnet set, and a drive unit for sending electric current through the moving coil. The rotary actuator may further include an assisting device for assisting shaft rotation which includes moving magnets on the side edges of the support and fixed magnets installed in the case facing the moving magnets, either the moving or fixed magnets being electromagnets.

7 Claims, 10 Drawing Sheets

ROTARY ACTUATOR

BACKGROUND OF THE INVENTION

This invention relates to a rotary actuator which converts electrical energy into a controlled force of rotation.

In devices for separating or sorting sheets of paper, it is customary to use a blade changeover mechanism as shown in FIGS. 2 and 3. FIG. 2 is an inclined view of such a mechanism in a conventional device. In the FIG., 1 is a plunger type solenoid, 1a is a plunger, 2 is a link, 3 is a lever, 4 is a shaft, 5 are blades, and 6 is a restoring spring. When the solenoid 1 is energized, the plunger 1a is a attracted to the solenoid 1 and the link 2 moves together with it in the direction A. The upper edge of lever 3 is then moved in direction A, and the shaft 4 rotates together with the blades 5 in direction B. FIG. 3 illustrates the case when the above paper sheet sorter is incorporated in a paper sheet transport path 7. When the solenoid 1 is energized, the position of blade 5 moves from FIG. 3 solid line in the figure to that of the dotted line, and paper sheets transported by roller 8 from side C are sent to the path D.

When solenoid 1 is de-energized, however, the upper edge of lever 3 returns in the direction E under the action of a restoring spring 6 which is attached between the lever 3 and the housing (not shown in the figure) under a specified tension. Shaft 4 then rotates in direction F, blade 5 moves from the position of the dotted line in the figure to that of the solid line, and paper sheets transported by roller 8 are sent to the path G.

A rotary solenoid as shown in FIG. 4, may be used in place of the plunger solenoid 1. This figure is a partial cut-away inclined view of a rotary solenoid 10. The stationary assembly consists of a case 11, base 12 and coil 13; the moving assembly consists of a rotor 14, and a shaft 15 fixed to the rotor 14.

A groove 16 (ball race) of substantially semi-circular cross-section in the upper part of case 11 extends in the direction of rotation H of the rotor 14. Several balls (not shown in FIG. 4) are interposed between rotor 14 and case 11 in ball race 16 such that they are free to turn, and support rotor 14 such that it can rotate. Further, the bottom of ball race 16 is sloped with respect to the direction H so that its depth gradually increases. With this arrangement, rotor 14 is pulled in direction I when coil 13 is energized, and rotates in the direction H in which the depth of ball race 16 becomes greater. When coil 13 is de-energized, rotor 14 rotates in the direction opposite to direction H under the action of a restoring spring (not shown in FIG. 4), and returns to its original position.

In these conventional structures, however, the following problems arise.

In the structure shown in FIG. 2, a mechanism such as the link 2 or lever 3 is necessary to convert the linear motion of plunger 1a into a rotary motion, and a large number of structural parts are required. The area for installing these structural components is therefore large, which is an effective obstacle to making the device compact. Further, the attraction of plunger 1a must overcome the restoring force of spring 6. Due to the considerable forces involved, rebound occurs easily, and it can also occur easily when the plunger 1a returns. It is thus difficult to obtain a stable action of the blades 5, with the result that the mechanism often jams when it is incorporated in a paper sheet sorter.

In the structure shown in FIG. 4, also, while there is no need for a mechanism to convert linear motion to rotary motion and while there is a smaller number of structural components, the ball race 16 has to be machined very precisely when the rotary solenoid 10 is manufactured and due to the difficulty of manufacture, the price of the assembly becomes high. Further, as a rotation is given in opposition to the restoring spring 6, the speed of rotation is low, and so processing speed is also low when the rotary selenoid 10 is incorporated in a paper sheet sortor.

SUMMARY OF THE INVENTION

An object of this invention is to provide a rotary actuator with low rebound, high speed action, compactness and low cost.

In this invention, a rotary actuator comprises a case, a shaft supported free to rotate in the case, a moving coil with conductors extending radially from the shaft as center, a support which supports the moving coil on the shaft, magnets set with unlike poles arranged alternately in the direction of motion of the moving coil on either side of it and generating a magnetic flux which crosses the moving coil conductors, a restricting device of the shaft rotation such that the conductors of the moving coil do not move outside the magnetic flux generated by the magnet set, and a drive unit for sending electric current through the moving coil. The rotary actuator may further comprise an assisting device of the shaft rotation consisting of moving magnets on the side edges of the support and fixed magnets installed in the case facing the moving magnets, either the moving or fixed magnets are electromagnets, and a drive unit sends current through the moving coil and coils of the electromagnets.

In the structure described above, a moving coil is fitted via a support to the shaft, which is itself supported such that it is free to rotate with respect to the case. The construction of this moving coil is such that its conductors extend radially from the shaft as center. Further, magnets are set near the coil such that their unlike poles are arranged alternately in the direction of motion of the coil on either side of it, and generate magnetic flux which crosses the coil conductors. When a current is passed through the coil by the drive unit, therefore, the current in the conductors flows in a direction crossing the magnetic flux generated by the magnet set and in accordance with Fleming's Left-Hand Rule, a force is generated in a direction perpendicular to the direction of the current and to the magnetic flux. The magnitude of this force is determined by the value of the current and the intensity of the magnetic flux. The free end of the support is thus moved together with the coil, causing the shaft to rotate and to deliver a rotating force to external devices via the shaft. A restricting device of the shaft rotation controls the range of movement of the support such that the conductors of the moving coil do not move outside the magnetic flux generated by the magnet set.

In case of an additional assisting device for assisting the shaft rotation, current is passed by the drive unit through the moving coil and through the coils of the electromagnets. By means of the attraction or repulsion between the moving and fixed magnets, therefore, a force can be applied to the support in addition to the force acting on the moving coil according to Fleming's Left-Hand Rule, and the support can therefore be moved even more rapidly.

The attraction force between the moving and fixed magnets can maintain the moving assembly in a far right or far left position without requiring holding current.

BRIEF DESCRIPTION OF THE DRAWINGS

FIG. 11 is a flowchart of the operation when power is switched on.

DETAILED DESCRIPTION OF THE PREFERRED EMBODIMENTS

Figure 1:
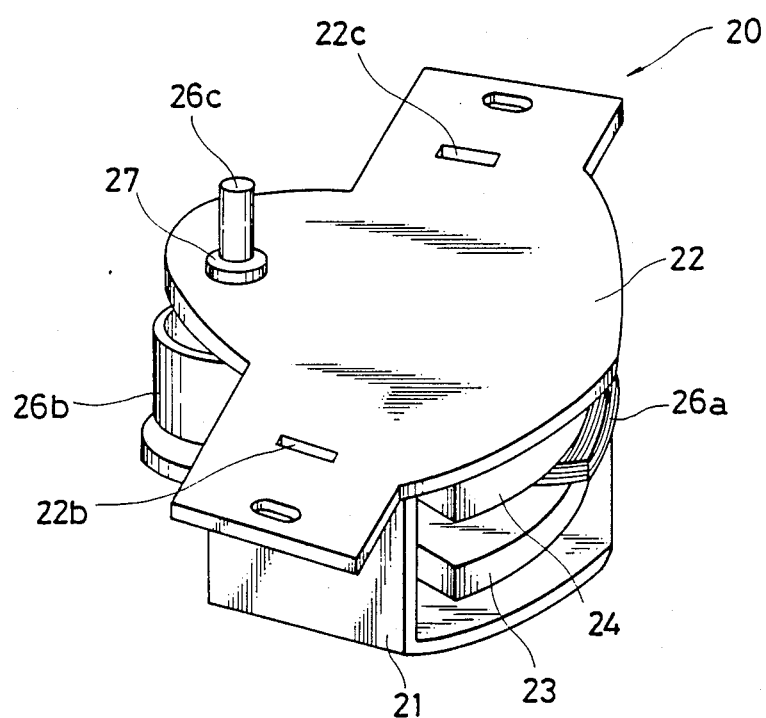
FIG. 1 is an external view of an embodiment of a rotary actuator according to the invention.

A preferred embodiment of the rotary actuator of this invention will be described with reference to the figures. In FIG. 1, 21 is the lower case, 22 is the upper case, 21a and 21b are pole pieces projecting inside the lower case 21, 25a and 25b are fixed coils fitted to the outer circumference of pole pieces 21a and 21b, and 23 and 24 are permanent magnets. These elements form the stationary assembly of the rotary actuator 20. Further, 26a is moving coil, 26b is support, 26c is a shaft, and 26e and 26f are moving magnets attached to the sides of the support 26d. These elements form the moving assembly 26 of rotary actuator 20. 27 is a bearing which supports shaft 26c in the upper case 22 such that it is free to rotate.

Figure 5:
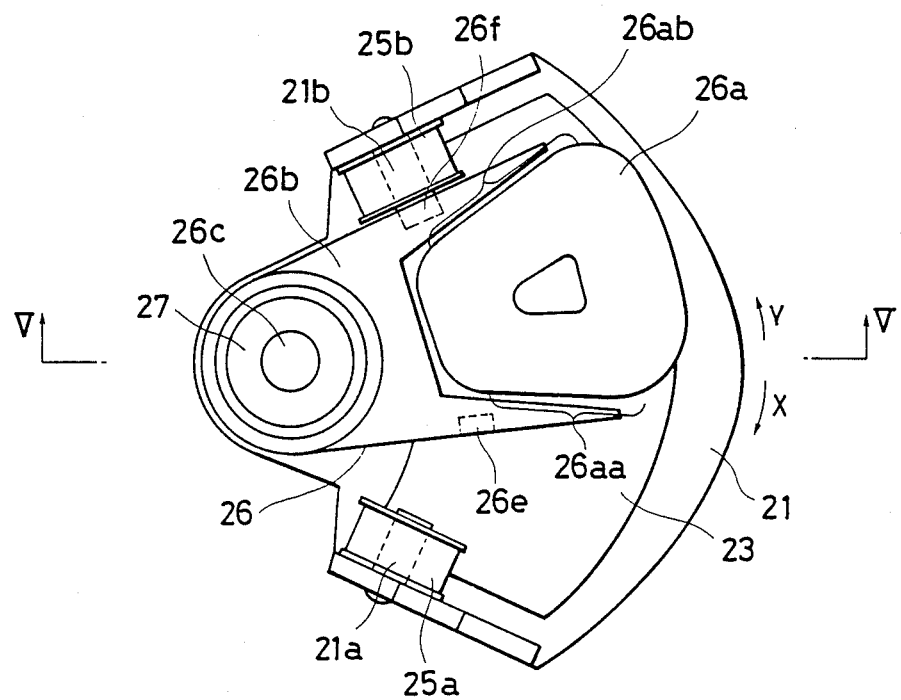
FIG. 5 is a plan view showing an enlarged portion of the embodiment of FIG. 1.
Figure 7:
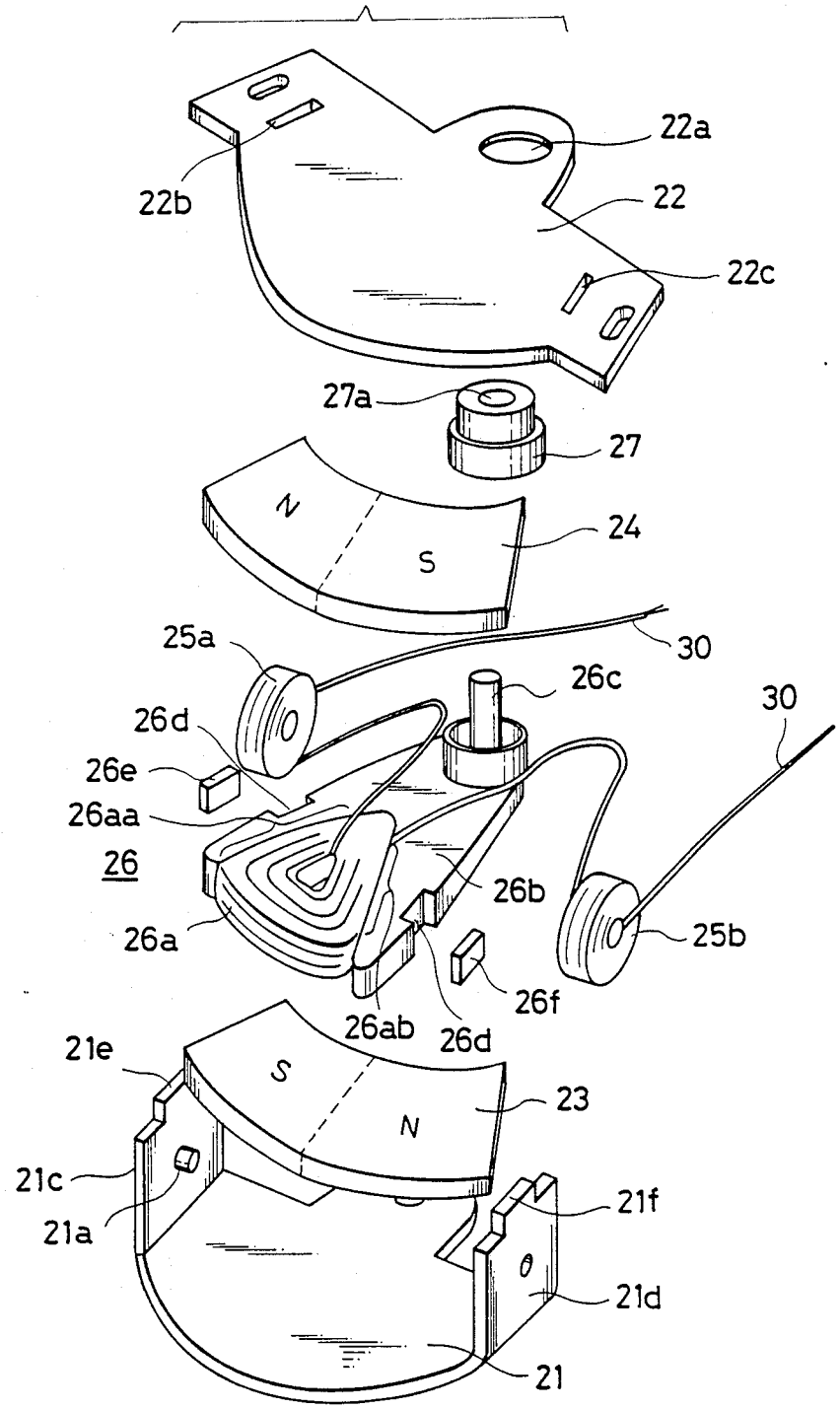
FIG. 7 is an assembly view of the structural elements of this embodiment.

Insofar as concerns the stationary assembly as shown in FIG. 7, two side plates 21c and 21d form the sides of lower case 21, and two projections 21e and 21f project on the upper edges of side plates 21c and 21d. These two projections 21e and 21f fit into two holes 22b and 22c in the upper case 22, thereby enclosing the whole structure. A permanent magnet 23 is fixed to the lower case 21 and a permanent magnet 24 is fixed to the upper case 22 by means of adhesive. Magnet 23 is magnetized S-N in the direction of motion of moving assembly 26 (corresponding to a direction indicated by Y in FIG. 5), while magnet 24 is magnetized N-S in the opposite direction. Magnets 23 and 24 are arranged with unlike poles facing each other so as to enclose moving coil 26a. In addition, the pole pieces 21a and 21b project from the inner surfaces of side plates 21c and 21d, fixed coils 25a and 25b being attached to their outer circumferences. Pole pieces 21a and 21b are made of iron or other magnetic material such that when a current is passed through fixed coils 25a and 25b, the pole pieces function as electromagnets. There is also a hole 22a in the upper case 22, and a bearing 27, supporting shaft 26c of the moving assembly 26, fits into the hole 22a.

Figure 6:
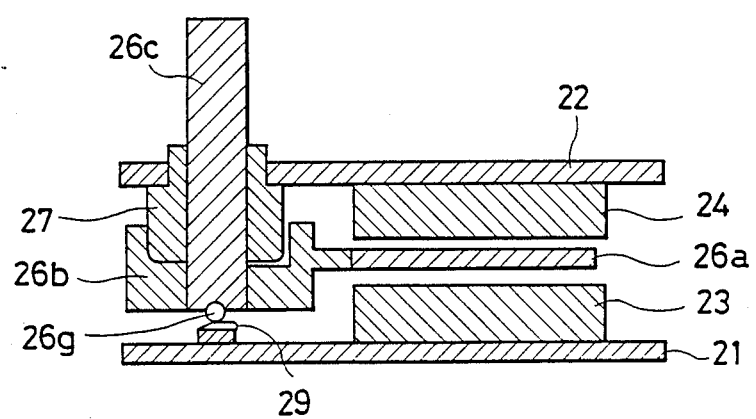
FIG. 6 is a cross-sectional view of the rotary actuator as taken along line V—V in FIG. 5.

Next, the structural elements of the moving assembly 26 will be described in detail. The moving assembly 26 consists of the following parts mounted on shaft 26c, which is supported such that it can rotate on bearing 27 in upper case 22. A slab-shaped support 26b is attached to shaft 26c, and a moving coil 26a is fixed to the free end of the support 26b. As shown in FIG. 6, a ball 26g projects from the lower end of shaft 26c such that its tip touches a spring 29 fitted to the lower case 21, and thereby biases shaft 26c upward. By means of this bias, the moving coil 26a is maintained in a suitable position between permanent magnets 23 and 24 with some degree of freedom in the direction of the length of shaft 26c. Ball 26g consists of a material with excellent wear resistance, the ball 26g and bearing 27 being situated at the center of rotation of moving assembly 26.

Moving coil 26a has conductors 26aa and 26ab extending radially from shaft 26c as center, and these conductors cross the magnetic flux generated by permanent magnets 23 and 24. The dimensional relationship of conductors 26aa and 26ab is such that when one of them (e.g. 26aa) is between a pair of facing unlike poles of permanent magnets 23 and 24 (e.g. S of 23 and N of 24), the other (26ab) does not lie between the same pair of facing unlike poles. Further, in this embodiment, the lead wires of moving coil 26a are connected in series with the lead wires of the fixed coils 25a and 25b, and current is passed through all of them simultaneously by means of the drive circuit shown below.

There are two grooves 26d on both sides of the free end of support 26b, and facing pole pieces 21a and 21b are disposed on the case 21. Moving magnets 26e and 26f are fixed to groove 26d so that when the moving assembly 26 rotates, they come into contact with pole pieces 21a and 21b and limit the range of rotation of shaft 26c. In this embodiment, therefore, the restricting device of the shaft rotation consists of the pole pieces 21a and 21b, and the moving magnets 26e and 26f on support 26b. Further in this embodiment, the assisting device of the shaft rotation consists of the electromagnets formed by pole pieces 21a, 21b and fixed coils 25a, 25b, together with the moving magnets 26e, 26f facing these electromagnets.

The restricting device of the shaft rotation is not limited to the above arrangement, and may consist instead of another part fixed to the case which comes into contact with a suitable point on support 26b. As the material of this other part can be chosen freely, the noise when this other part is struck and rebound can be reduced.

In the above description, it has been considered that the electromagnets forming the assisting device of the shaft rotation are fitted to the case, but they may equally well be fitted to the moving assembly 26.

Further, it has been considered that the electromagnets forming the assisting device of the shaft rotation and moving magnets 26e, 26f are fitted to both sides of support 26b, but they may also be fitted to only one side.

Figure 8B:
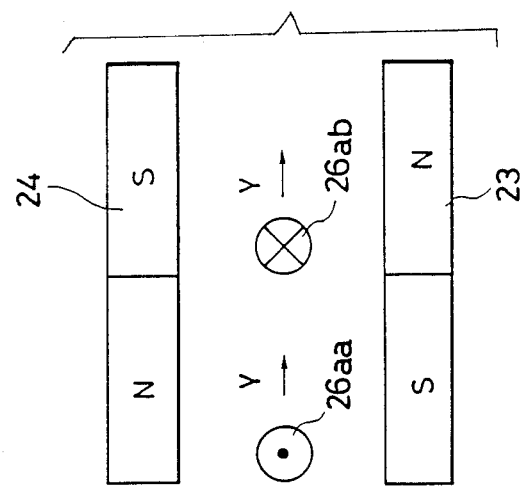
FIG. 8A and FIG. 8B are schematic diagrams showing the operating principle of the rotary actuator of FIG. 1.
Figure 8A:
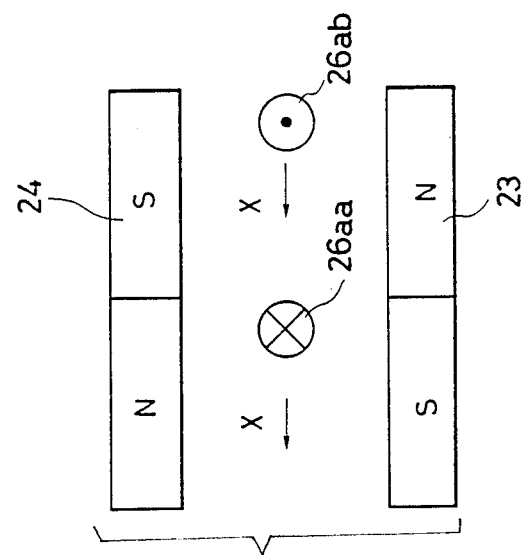

The mechanism of the operation will be described. FIGS. 8A and 8B show the operating principle of the rotary actuator. FIG. 8A illustrates the case when moving coil 26a is in the position shown in FIG. 6; FIG. 8B illustrates the case when it is on the opposite side to this position. Also, in these figures, the symbols ⊙ and ⊗ denote the directions of current flow; ⊙ indicates that current is flowing out from the paper, and ⊗ indicates that current is flowing into the paper. As is evident from this figure, conductors 26aa and 26ab of moving coil 26a extending radially from shaft 26c as center are arranged such that when conductors 26aa are crossing the magnetic flux directed in one direction, conductors 26ab cross the magnetic flux directed in the other direction. When the coil is in position Shown in the FIG. 8A (referred to hereafter as the far right position) and current is made to flow in the direction shown, a force acts on conductors 26aa and 26ab in the direction X in accordance with Fleming's Left-Hand Rule. When, however, it is in the position shown in the FIG. 8B (referred to hereafter as the far left position) and current is made to flow in the direction shown, a force acts on conductors 26aa and 26ab in the direction Y.

Further, in this embodiment, when current is made to flow in moving coil 26a, current also flows simultaneously in fixed coils 25a and 25b. This generates a force in either the X or Y directions (indicated by corresponding arrows in FIG. 5) and thereby assists the rotation of support 26b. More specifically, when a force is made to act on conductors 26aa and 26ab in direction X, a current is passed through fixed coils 25a, 25b in such a direction that an attraction is set up between moving magnet 26e and pole piece 21a, and a repulsion is set up between moving magnet 26f and pole piece 21b, the pole pieces functioning as electromagnets. When moving assembly 26 moves from the far right position to the far left position (direction X), and additional force therefore acts on moving coil 26a as a result, the rotation of moving assembly 26 becomes extremely rapid. Further, when assembly 26 is moved from the far left position to the far right position (direction Y), an additional force of rotation is set up in the same way so that the rotation of assembly 26 can be speeded up. Further, when the coil has stopped in either the far left or far right position, the pole pieces 21a, 21b are attracted to the moving magnets 26e, 26f, with no holding current being passed through moving coils 25a and 25b. In this way, assembly 26 can be maintained in a fixed position.

Figure 9:
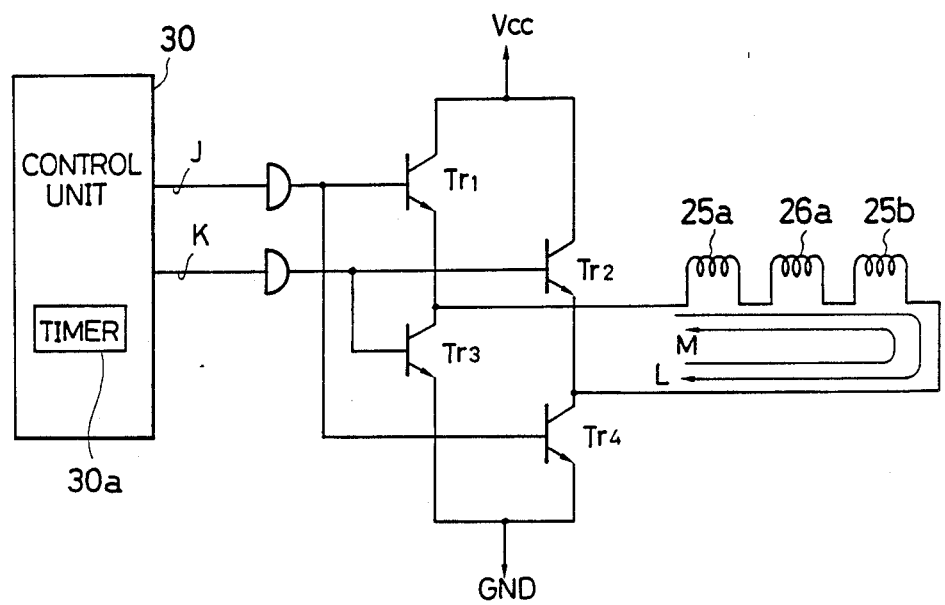
FIG. 9 is a circuit diagram of a drive unit for the rotary actuator.
Figure 10:
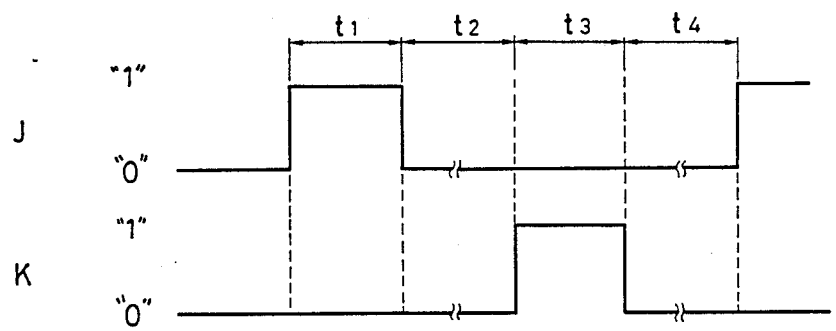
FIG. 10 is a signal waveform diagram of the drive unit output signals.

Next, the control of this rotary actuator will be described. FIG. 9 is a circuit diagram showing the action of rotary actuator 20. FIG. 10 is the signal waveform diagram of the output of the actuator 20. In the operating circuit, a logic value 1 (referred to hereafter as control signal 1) is output from control unit 30 in signal line J; a logic value 0 (referred to hereafter as control signal 0) is output in signal line K. When this occurs, transistors Tr1 and Tr4 are switched on, and transistors Tr2 and Tr3 are switched off. A drive current therefore flows in fixed coils 25a and 25b and in moving coil 26a in the direction L, with the result that moving coil 26a moves toward fixed coil 25a, i.e. from the far right position in the direction shown in FIG. 8A. On the other hand, when control signal 0 is output from control unit 30 in signal line J, and control signal 1 is output in signal line K, transistors Tr1 and Tr4 are switched off, and transistors Tr2 and Tr3 are switched on. A drive current then flows in fixed coils 25a and 25b and in moving coil 26a in the direction M, with the result that moving coil 26a moves toward fixed coil 25b, i.e. from the far left position in the direction Y shown in FIG. 8B.

Figure 11:
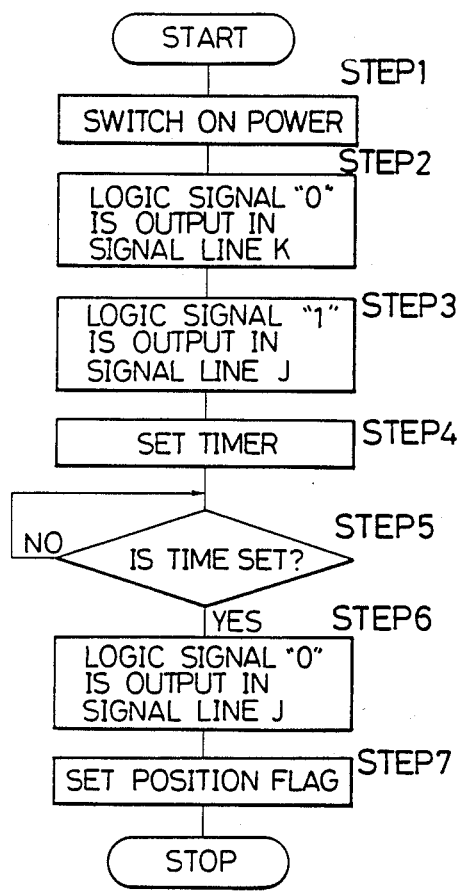
Figure 12:
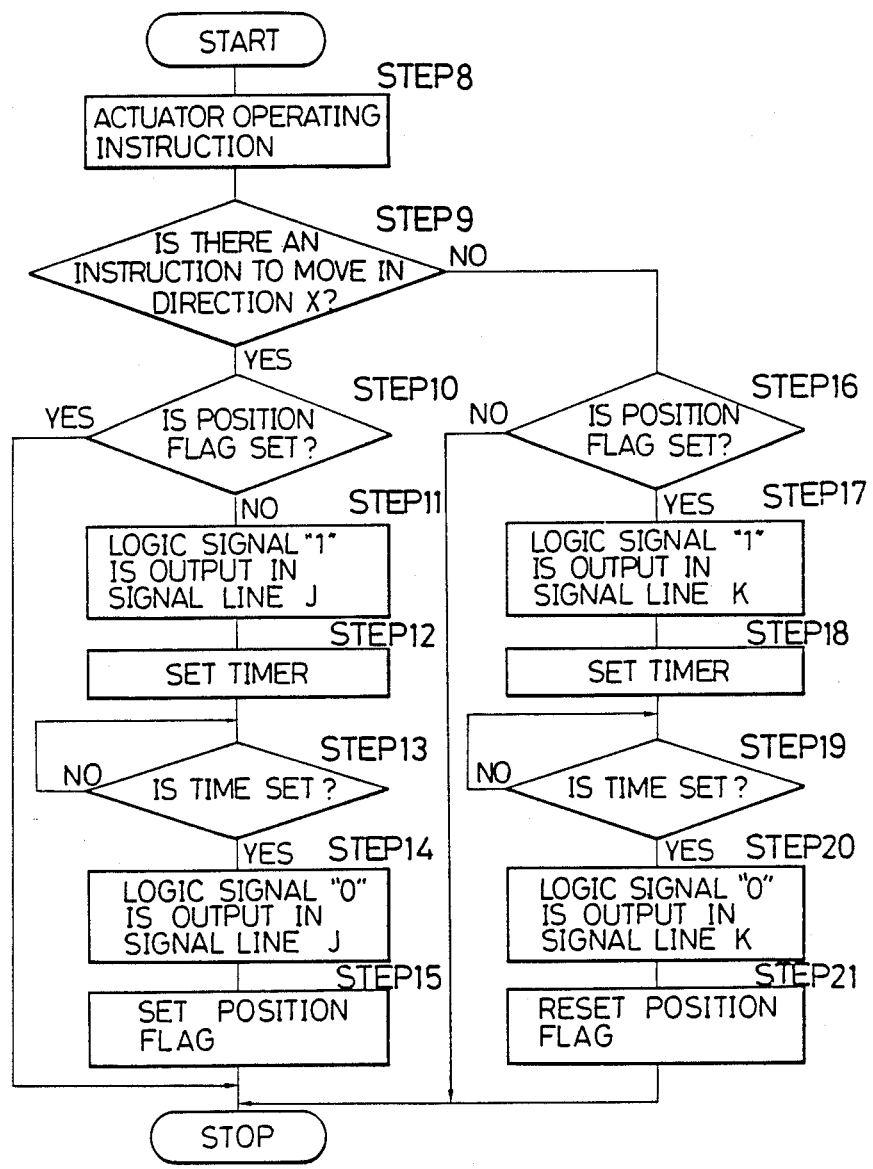
FIG. 12 is a flowchart of the operation of the drive unit of FIG. 9 when system is operating normally.

FIG. 11 is a flowchart showing the operation of this embodiment of the invention when power is switched on; FIG. 12 is a flowchart for the case when the system is operating normally. In FIG. 11, when power is supplied to control unit 30 in Step 1, control signal 0 is output from the unit 30 in signal line K in Step 2, and then control signal 1 is output in signal line J in Step 3. When this occurs, transistors Tr1 and Tr4 are switched on, transistors Tr2 and Tr3 are switched off, and moving coil 26a moves in the direction X. At this time, in Step 4, a specified time is set on timer 30a which is integrated in control unit 30. Here, the times set on timer 30a are t1 and t3 as shown in FIG. 10. These times are chosen to be sufficiently long for moving coil 26a to move in direction X or Y. When the specified time (t1 or t3) is deemed to have elapsed in Step 5, control signal 0 is output in signal line J in Step 6. Transistors Tr1 and Tr4 then switch off, so that current ceases to flow in coils 25a, 25b and 26a. Moving coil 26a however has already completed its movement in direction X and is at its extreme position on the far left, and as pole piece 21a are attracted by moving magnet 26e, moving coil 26a remains in its extreme left-hand position. In Step 7, a position flag is set by means of which control unit 30 memorizes that moving assembly 26 is on the far left.

Next, normal operation will be described with reference to FIG. 12. Firstly, in Step 8 in FIG. 12 an operating instruction for the rotary actuator 20 is input to control unit 30 from a control panel (not shown). In Step 9, a decision is made as to whether this is an instruction to move assembly 26 in direction X or direction Y. If it is to be moved in direction X, control proceeds to Step 10, and a decision is made as to whether there is a position flag indicating that the assembly 26 is at the far left. If there is a flag (indicating that the assembly 26 is already in the far left position), no control signal is output from control unit 30 and the assembly 26 is not moved. There is no position flag, if the assembly 26 is in its far right position. If no flag is set in Step 10, control signal 1 is output from control unit 30 in signal line J in Step 11, so that the assembly 26 moves from its far right position in direction X. When the time set on timer 30a has elapsed, energization for moving the assembly 26 in direction X is terminated (by which time the assembly 26 is assumed to complete its movement in direction X), and control signal 0 is output by control unit 30 in signal line J in Step 14. Transistors Tr1 and Tr4 then switch off, the drive circuit stops operating and a position flag is set.

If however it is decided in Step 9 that the instruction is not to move the assembly 26 in direction X, it is decided that the instruction is to move it in direction Y and control proceeds to Step 16. Here, if no position flag is set, the drive circuit does not operate. If a flag is set, control signal 1 is output from control unit 30 from signal line K in Step 17, and the assembly 26 is moved from its far left position in direction Y. When the assembly 26 has completed its movement in direction Y, control signal 0 is output from control unit 30 in signal line K in Step 20. Transistors Tr2 and Tr3 then switch off, the drive circuit stops operating, and the position flag is reset in Step 21.

In this way, the position of assembly 26 can be stored in memory by setting and resetting the position flag and it can be moved in either direction. There is therefore no need to use a restoring spring or other such means to apply a force to the assembly in any particular direction, and as a result, high speed operation is possible.

Figure 2:
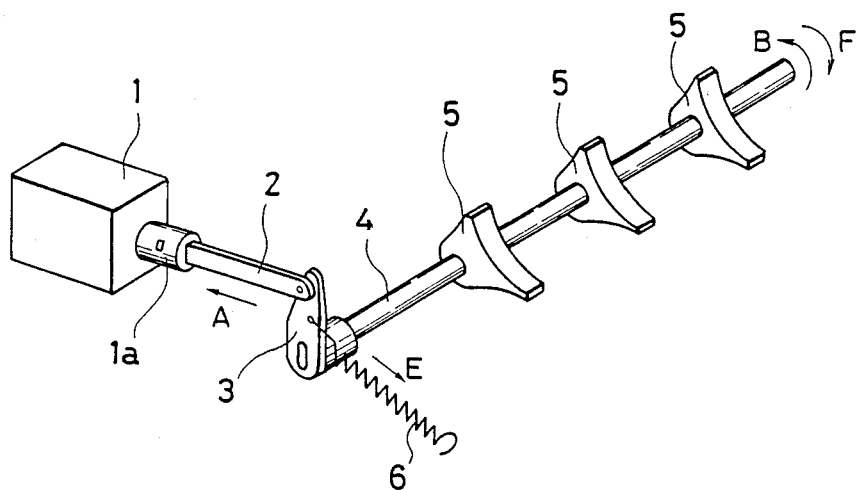
FIG. 2 is an inclined view of a conventional blade changeover device.
Figure 3:
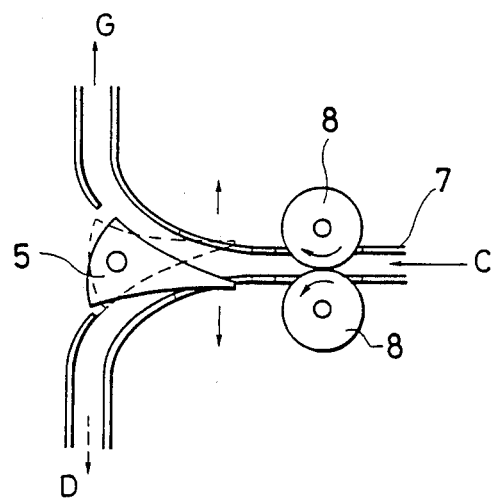
FIG. 3 is a schematic diagram of a conventional paper sheet sorter.
Figure 4:
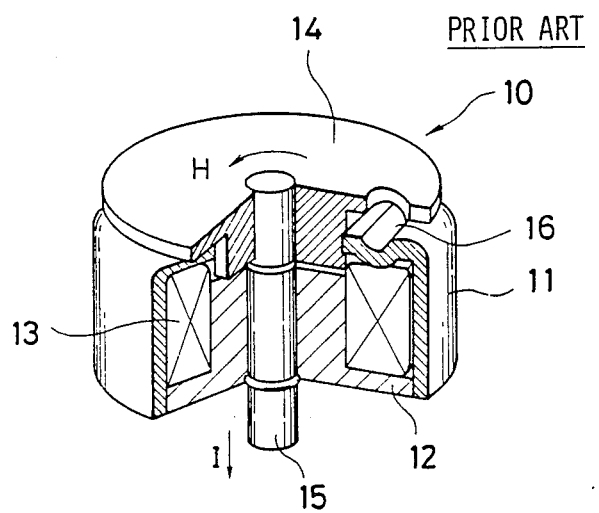
FIG. 4 is a partial cut-away inclined view of a conventional rotary solenoid.
Figure 13:
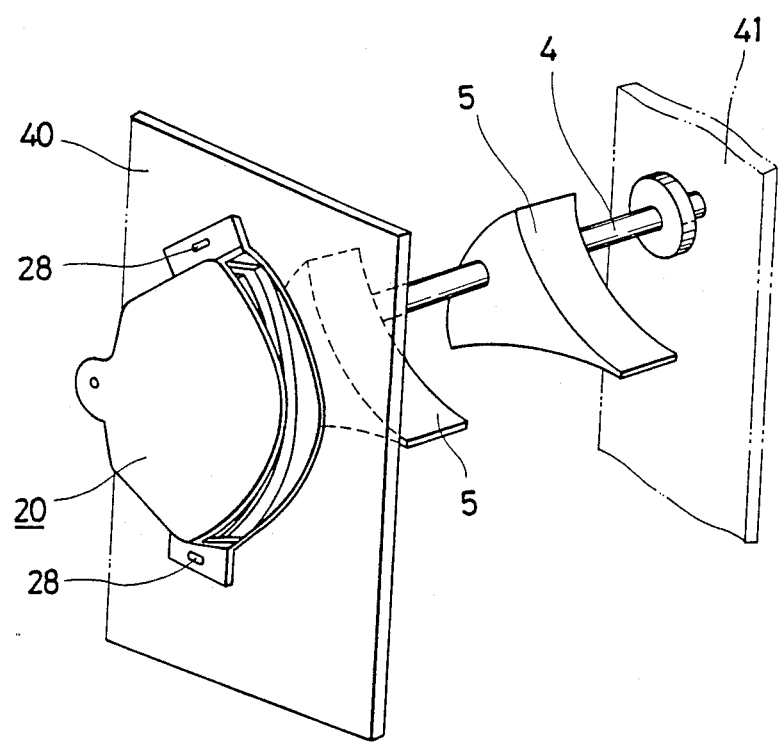
FIG. 13 is a structural diagram showing an application of the rotary actuator of FIG. 1 in a paper sheet sorter.

FIG. 13 is a structural diagram showing a paper sheet sorter mechanism in which the above embodiment is applied. In this figure, 40 and 41 show part of the housing. The rotary actuator 20 is fixed to the housing 40 by means of a screw (not shown) through screw hole 28. Also, the rotary motion is obtained directly in the rotary actuator 26, and so the shaft 4 of the paper sorting mechanism can be connected directly to shaft 26c. A mechanism which would be required to convert linear motion to rotary motion in the conventional device shown in FIG. 2 is therefore not necessary, and the structure according to the invention can thus be simplified. Further, the structure of actuator 20 has very little rebound. This gives the blades a steady action, and as start-up is also rapid, the blade position can be changed over rapidly.

In the above embodiment, the case has been described where the lead wires for moving coil 26a and fixed coils 25a, 25b are connected in series, but in this invention, they may also be connected to the drive circuit separately. In the latter case, however, the drive timings, magnetization timings and currents in the moving coil and fixed coils must be controlled independently.

In this invention, when current is passed by a drive circuit through a moving coil, the current in the conductors extending radially from the shaft as their center crosses the magnetic flux generated by magnets. A force perpendicular to both the direction of the current and to that of the magnetic flux therefore acts on the coil in accordance with Fleming's Left-Hand Rule, and the shaft is rotated. In this construction, there is no need for a spring or other such means to return the shaft to its original position, so the rotation can be started up quickly. Also, as there is no spring, there is no need to apply excessive force to the moving assembly, so that an action with very little rebound is obtained. Further, as rotary motion is obtained directly in this invention, there is no need for a cam, link or similar structure. The mechanism can therefore be simplified, made more compact, and can be made at less cost than the conventional actuator.

Further, curent can be passed by the drive circuit in either direction through the moving coil, and in addition, a control unit stores in memory the position of the moving coil and controls the direction of the current flowing through it. When the coil is already in its far left position, therefore, it is not driven to the left, and when it is in its far right position, it is not driven to the right. In this way, useless drive actions are eliminated.

Additionally, moving magnets may be fitted to the rotating edges of the support, and stationary magnets are fitted to the case facing the moving magnets, either the moving or stationary magnets or both being electromagnets. This constitutes and assisting means of rotation, in addition to the force applied to the moving coil by the drive circuit in accordance with Fleming's Left-Hand Rule. Therefore an attraction or a repulsion is generated between the moving magnets and the fixed magnets. In this way, the rotating force or torque and in particular the rotary force on start-up can be increased, so that the rotation of the shaft can be speeded up even further. When the moving coil is in far right or far left position, the moving assembly is maintained in the fixed position without holding current. This also reduces the rebound of the moving assembly.

If this invention is incorporated in a paper sheet sorter mechanism, a stable action with very little jamming can therefore be obtained with a compact structure.

What is claimed is:

1. A rotary actuator comprising:
   a case;
   a shaft positioned within said case, said shaft being rotatable about its axis;
   a movable coil having a first and a second conductor extending radially from the axis of said shaft;
   a support member supporting said movable coil on said shaft;
   a magnet set including a plurality of magnets in facing relationship, each of said magnets having a plurality of poles, respective adjacent opposed pairs of said poles in facing ones of said plurality of magnets including unlike poles which are arranged alternately in a direction along a path which is generally parallel to the path of motion of said movable coil, said magnet set extending along a range of rotational movement on either side of said movable coil and generating a magnetic flux which intersects said first and second conductors;
   one of said first and second conductors lying between one of said facing pairs of unlike poles, and the other one of said first and second conductors lying between another facing pair of unlike poles; and
   means for restricting rotation of said movable coil relative to said casing such that said conductors of said movable coil do not move outside the magnetic flux generated by said magnet set.

2. A rotary actuator as set forth in claim 1, further comprising drive means for selectively supplying electric current to said movable coil in a selected direction.

3. A rotary actuator as set forth in claim 2, further comprising control means including a memory for storing in said memory the position of said movable coil and for controlling the current supplied to said movable coil by said drive means depending on said stored position.

4. A rotary actuator as set forth in claim 2, further comprising control means including a memory for storing in said memory the position of said movable coil, said control means determining the direction in which said movable coil is to be moved and stopping current flow to said movable coil when the position of said movable coil is at an extreme position relative to said case and said direction is toward the extreme position occupied by the movable coil.

5. A rotary actuator comprising:
   a case;
   a shaft positioned within said case, said shaft being rotatable about its axis;
   a movable coil having a first and a second conductor extending radially from the axis of said shaft;
   a support member supporting said movable coil on said shaft;
   a magnet set including a plurality of magnets in facing relationship, each of said magnets having a plurality of poles, respective adjacent opposed pairs of said poles in facing ones of said plurality of magnets including unlike poles which are arranged alternately in a direction along a path which is generally parallel to the path of motion of said movable coil, said magnet set extending along a range of rotational movement on either side of said movable coil and generating a magnetic flux which intersects said first and second conductors;
   means for restricting the shaft rotation such that the conductors of said movable coil do not move outside the magnetic flux generated by said magnet set;

drive means for selectively sending electric current through said movable coil in a selected direction; and control means including a memory for storing in the memory the position of said movable coil and for controlling the direction of current supplied to said movable coil by said drive means depending upon the position stored in the memory.

6. A rotary actuator comprising:

a case;

a shaft positioned within said case, said shaft being rotatable about its axis;

a movable coil having a first and a second conductor extending radially from the axis of said shaft;

a support member supporting said movable coil on said shaft;

a magnet set including a plurality of magnets in facing relationship, each of said magnets having a plurality of poles, respective adjacent opposed pairs of said poles in facing ones of said plurality of magnets including unlike poles which are arranged alternately in a directing along a path which is generally parallel to the path of motion of said movable coil, said magnet set extending along a range of rotational movement on either side of said movable coil and generating a magnetic flux which intersects said first and second conductors;

an assisting means for assisting rotation of said shaft, said assisting means including magnets respectively disposed on side edges of said support member and fixed magnets connected to said case in facing relationship to respective ones of said magnets disposed on the side edges of said support member, said fixed magnets being electromagnets; and drive means for selectively supplying electric current to said movable coil and to said fixed magnets.

7. A rotary actuator comprising:

a case;

a shaft positioned within said case, said shaft being rotatable about its axis;

a movable coil having a first and a second conductor extending radially from the axis of said shaft;

a support member supporting said movable coil on said shaft;

a magnet set including a plurality of magnets in facing relationship, each of said magnets having a plurality of poles, respective adjacent opposed pairs of said poles in facing ones of said plurality of magnets including unlike poles which are arranged alternately in a direction along a path which is generally parallel to the path of motion of said movable coil, said magnet set extending along a range of rotational movement on either side of said movable coil and generating a magnetic flux which intersects said first and second conductors; and an assisting means for assisting rotation of said shaft, said assisting means including magnets disposed on side edges of said support member and fixed magnets connected to said case in facing relationship to corresponding ones of said magnets which are disposed on said side edges of said support member, said fixed magnets being electromagnets.

* * * * *

UNITED STATES PATENT AND TRADEMARK OFFICE
CERTIFICATE OF CORRECTION

PATENT NO. : 4,870,335

DATED : September 26, 1989

INVENTOR(S) : Koshida et al

It is certified that error appears in the above-identified patent and that said Letters Patent is hereby corrected as shown below:

Title Page:

In the heading of the patent under [30] Foreign Application Priority Data, under the first Japanese Application, insert --Dec. 17, 1987 [JP] Japan ....................62-319824--.

Signed and Sealed this

Twenty-third Day of July, 1991

Attest:

HARRY F. MANBECK, JR.

*Attesting Officer*   *Commissioner of Patents and Trademarks*